(12) United States Patent
Neri

(10) Patent No.: US 7,174,856 B2
(45) Date of Patent: Feb. 13, 2007

(54) METHOD AND APPARATUS FOR ANIMAL BEHAVIOR MODIFICATION

(75) Inventor: Doron Neri, Ramat Hasharon (IL)

(73) Assignee: The Company of Animals Limited, Bedfordshire (GB)

( * ) Notice: Subject to any disclaimer, the term of this patent is extended or adjusted under 35 U.S.C. 154(b) by 0 days.

(21) Appl. No.: 10/907,137

(22) Filed: Mar. 22, 2005

(65) Prior Publication Data

US 2005/0279288 A1 Dec. 22, 2005

Related U.S. Application Data

(63) Continuation of application No. PCT/IL02/00847, filed on Oct. 23, 2002.

(30) Foreign Application Priority Data

Aug. 12, 2002 (IL) .................................. 151214

(51) Int. Cl.
 *A01K 15/02* (2006.01)
 *A01K 15/00* (2006.01)
(52) U.S. Cl. ...................... 119/718; 119/712
(58) Field of Classification Search ............... 119/712, 119/718, 719; 239/333
See application file for complete search history.

(56) References Cited

U.S. PATENT DOCUMENTS

| 3,292,578 | A | | 12/1966 | Stout |
| 4,627,385 | A | * | 12/1986 | Vinci .......................... 119/718 |
| 5,013,769 | A | | 5/1991 | Murray et al. |
| 5,501,179 | A | | 3/1996 | Cory |
| 5,655,691 | A | | 8/1997 | Stern et al. |
| 5,722,950 | A | | 3/1998 | Fujita et al. |
| 5,769,283 | A | * | 6/1998 | Owada et al. ............ 222/402.2 |
| 6,029,862 | A | * | 2/2000 | Jones ....................... 222/402.11 |
| 6,250,253 | B1 | | 6/2001 | Margulis |
| 6,385,915 | B1 | | 5/2002 | Keeler |
| 6,415,992 | B1 | * | 7/2002 | Blondeel et al. ............. 239/337 |
| 6,604,490 | B1 | * | 8/2003 | Lee, IV et al. ............... 119/712 |
| 2003/0136353 | A1 | * | 7/2003 | Cory ........................... 119/712 |
| 2005/0109286 | A1 | * | 5/2005 | Lange et al. ................ 119/719 |

FOREIGN PATENT DOCUMENTS

DE 4420253 * 6/1994
JP 2005138052 A * 6/2005

OTHER PUBLICATIONS

Garden Ghost Animal Repellent System; www.smarthome.com/6208.html; 1995-2005.*
Animal Repellent; www.shop.com/op/aprod-p8061103?sourceid=3; 1997-2005.*
Muiltivet Ssscat Automated Cat Repellent Device Kit; store.yahoo.com/pet-king/624834190012.html; 2005.*
International Search Report from PCT/Il2002/000847.

* cited by examiner

*Primary Examiner*—Teri Pham Luu
*Assistant Examiner*—Elizabeth Shaw
(74) *Attorney, Agent, or Firm*—WRB - IP LLP

(57) ABSTRACT

A method and apparatus for modifying animal behavior when animal performs an undesirable behavior, wherein a user discharging an inert gas stream at an animal body from a distance via the use of inert gas spray canister whereby the animal behavior is modified.

11 Claims, 3 Drawing Sheets

METHOD AND APPARATUS FOR ANIMAL BEHAVIOR MODIFICATION

This application is a continuation of International Application No. PCT/IL2002/00847, filed Oct. 23, 2002, which designated the U.S.

BACKGROUND OF THE INVENTION

The present invention relates to an apparatus and method for modifying animal behavior, in general and more specifically to the immediate and delayed behavior modification by the application of a sudden burst of inert gas stream and noise created by the same.

DISCUSSION OF THE RELATED ART

Devices and methods for animal behavior modification are known in the art. As with other forms of behavior modification most devices and methods use positive or negative feedbacks as stimulants for behavior modification.

Feedback stimulation for animal behavior modification works by enforcing certain patterns of behaviors while extinguishing others. With the case of negative feedback the animal senses are subjected to unpleasant stimuli when a certain behavior pattern is performed. The animal's central nervous system of the animal learns to avoid the behavior associated with the offensive stimuli thus altering behavior. The same principle applies to positive feedback stimulation where using rewarding stimuli for the animal senses when the animal perform a desirable behavior enforces fixation of this behavior pattern.

One popular method using negative feedback stimulation is the use of an electric shock for animal behavior modification. In this method the trainer holds an electric shock device or the animal wears the device. When the animal performs an unwanted behavior pattern such as continuous barking or attempts to attack the trainer applies an electric shock to the animal for extinction of the nondesirable behavior. In another device, the barking of the dog may also trigger such electric shock. The use of the electric shock for animal behavior modification is considered inhuman by many due to the pain inflicted on the animal. This training method can cause considerable stress to the animal.

Another popular apparatus and method for dog behavior modification is the anti-barking collar. Anti-barking collar utilizes ultrasonic sounds, electric shock as well as vibrating devices for the extinguishing of barking behavior.

These devices fall within the negative feedback stimuli category. A trainer has a remote control unit whereby the anti-barking collar features are activated. The anti-barking collar is used with one pet at a time because the animal, such as a dog must wear this device. In addition more multiple trials may be needed to stop a certain behavior. Furthermore the collar is used at a distance whereby the animal may not correlate her behavior with the trainer whishes. The Anti-barking collar is an expensive animal behavior modification device ranging from a hundred dollar and more. It can cause stress to the animal when employing electric shock.

Recently citronella oil spray has also been used for animal behavior modification. The citronella oil is sprayed at animals with heighten olfactory senses when said animal performs undesirable behavior. Citronella oil irritates the animals' sensitive olfactory senses thus providing a negative feedback. This method is probably painful to the animal and may be stressful.

Other older animal behavior modification methods now considered obsolete or inhumane include the use of beatings, high decibel air horns as well as vocal cord extraction.

One other method for animal behavior alteration involves the use of a professional animal trainer. This method is utilized mainly for dogs and other relatively intelligent animals. The animal is brought to the trainer and left with the trainer for a time period of days to weeks. During this time period the trainer modify the animal behavior using various techniques. Although highly efficient, the use of a dog trainer mandates the separation of the animal from its owner and is a very expensive method for training animals.

Positive feedback techniques such as rewarding the animal for desirable behavior are also known in the art. Most of these techniques involve feeding the animal food that is palatable to them. This is useful when teaching the animal new behavior. It is less efficient in the extinction of unwanted behavior.

The use of vocalization is particularly useful in intelligent motivated animals such as dogs and monkeys. Changing behavior by using vocalization alone is very slow.

There is a need in the art for a cheap, safe, environmentally friendly, harmless, instant and effective method for animal behavior modification.

Condensed inert gas cleaning sprays for computer and related hardware are known in the art. One cleaning spray for cleaning uses canned air spray such as Canned Air from Computer Cleaning Products. The canned air cleaning spray contains condensed air that is discharged at computer hardware such as the keyboard for the purpose of removing small dust and dirt particles.

This spray is used with other cleaning utilities such as cleaner materials, disinfectants as well as clothes and other cleaning utilities. Other condensed inert gas cleaning spray can contain different high-pressure inert gases such as Chlorodifluoromethane (also known as Algeon, Freon etc. ) as well as other gases of the Tumorigen compound class. Some of the Tumorigen compound class gases containing fluorocarbon are now outlawed in some western countries due to their harmful effect on the ozone layer. One other inert gas compound which is environmentally friendly, used in computer and other hardware cleaning spray containers such as from DuPont is the Ethane, 1,1,1,2-tetrafloro also known as Arcton 134a and the like.

Condensed inert gas cleaning sprays are used via application of a fast burst or stream of air or other gas onto a hardware part. The gas stream mechanically displaces particles from their location thus in effect cleaning the hardware part. A person using the cleaning spray holds the canister at a short distance of around 10 to 20 centimeters from a hardware piece pointing the aperture and pressing the trigger. When the cleaning gas canister is triggered, a burst of condensed gas is released from the can flowing in a cold fast stream onto the hardware device applying kinetic force (created by pressure release) to displace any particles of dirt and dust. The gas burst is accompanied by a sharp noise of low decibel that is not harmful to the human ear. The inert gas stream is harmless to the skin or eyes.

It will be appreciated by those skilled in the art that process of animal behavior modification and condensed inert gas cleaning sprays are complete and separate applications in the prior art.

It will also be appreciate by those skilled in the art that in the prior art the use of sprays for animal behavior modification is restricted to the application of noxious particles to the animal olfactory receptor organs and is not involving the application of fast, cold and noisy gas stream for the purpose mentioned above.

SUMMARY OF THE INVENTION

It is an object of the present invention to provide a novel method and apparatus for modifying animal behavior, which overcomes the disadvantages of the prior art.

In accordance with the present invention, there is thus provided a method for modifying animal behavior when the animal performs an undesirable behavior or attempts an attack, the method comprising a user discharging an inert gas stream at an animal body from a distance via the use of inert gas spray canister whereby the animal behavior is modified. The inert gas stream is a short and fast striking the animal body. The gas can be comprised of Tumorigen compound class. The use of the inert gas stream creates a loud and hissing sound.

The method can be used in connection with a pet, a domestic animal, a wild animal. Preferably the animal body is the head of the animal. The distance for using of the gas spray canister away from the animal is about 30–50 centimeters.

The gas spray canister further comprises a body and a cap. The cap further comprises a trigger and an aperture. Any behavior including vocalization, loitering in undesirable location, destroying property, engaging in fight with other animals, attacking humans can be modified in accordance with the present invention.

In accordance with the present invention, there is also provided an apparatus for modifying animal behavior, the apparatus comprising a spray canister containing pressurized inert condensed gas, a canister cap, aperture and a trigger, whereby a user point the canister aperture from a distance towards an animal and presses the canister trigger and where a sudden gas discharge and noise accompanied provide for a negative feedback for animal undesirable behavior. The inert condensed gas can be 1,1,1,2-tetrafluoroethane, Chlorodifluoromethane, or 1,1,1,2-tetrafluoroethane, dichlorodifluoromethane, or like gasses, which create a strong hissing noise when discharged from a spray gas canister. The canister vapor pressure can be about 3 kg/cm$^2$ to 7 kg/cm$^2$ or 60–90 PSI.

BRIEF DESCRIPTION OF THE DRAWINGS

The present invention will be understood and appreciated more fully from the following detailed description taken in conjunction with the drawings in which.

DETAILED DESCRIPTION

The present invention overcomes the disadvantages of the prior art by providing a novel method enhance and improves prior animal behavior modification methods.

The present invention provides for a process by which a powerful condensed inert gas jet or stream is used for animal behavior modification. The present invention is especially suitable for use with dogs, cats, horses and other small mammals although it can be useful with other animals. The process involves the appropriate application of the inert gas stream emanating from the spray canister on animals. Characteristics of this process by which animal behavior is modified include the provision of unpleasant stimuli or a negative stimuli to the animal in the form of fast sudden rush of gas accompanied by loud hissing noise.

The inert gas spray canister can be used manually via the users hand and can be attached to the animals collar or to a garment worn by the animal.

The process is substantially painless and harmless to the animal and user. The process can be used by basically any person. The process is humane and can be used to stop behavior patterns such as biting or attacking humans as well as other animals, jumping on persons or on furniture, fighting with other animals, barking, hissing and the like. The use of this process negates the need for old less humane and less efficient training methods.

The process and apparatus is environmentally friendly, easy to use and cheap.

Figure 1:
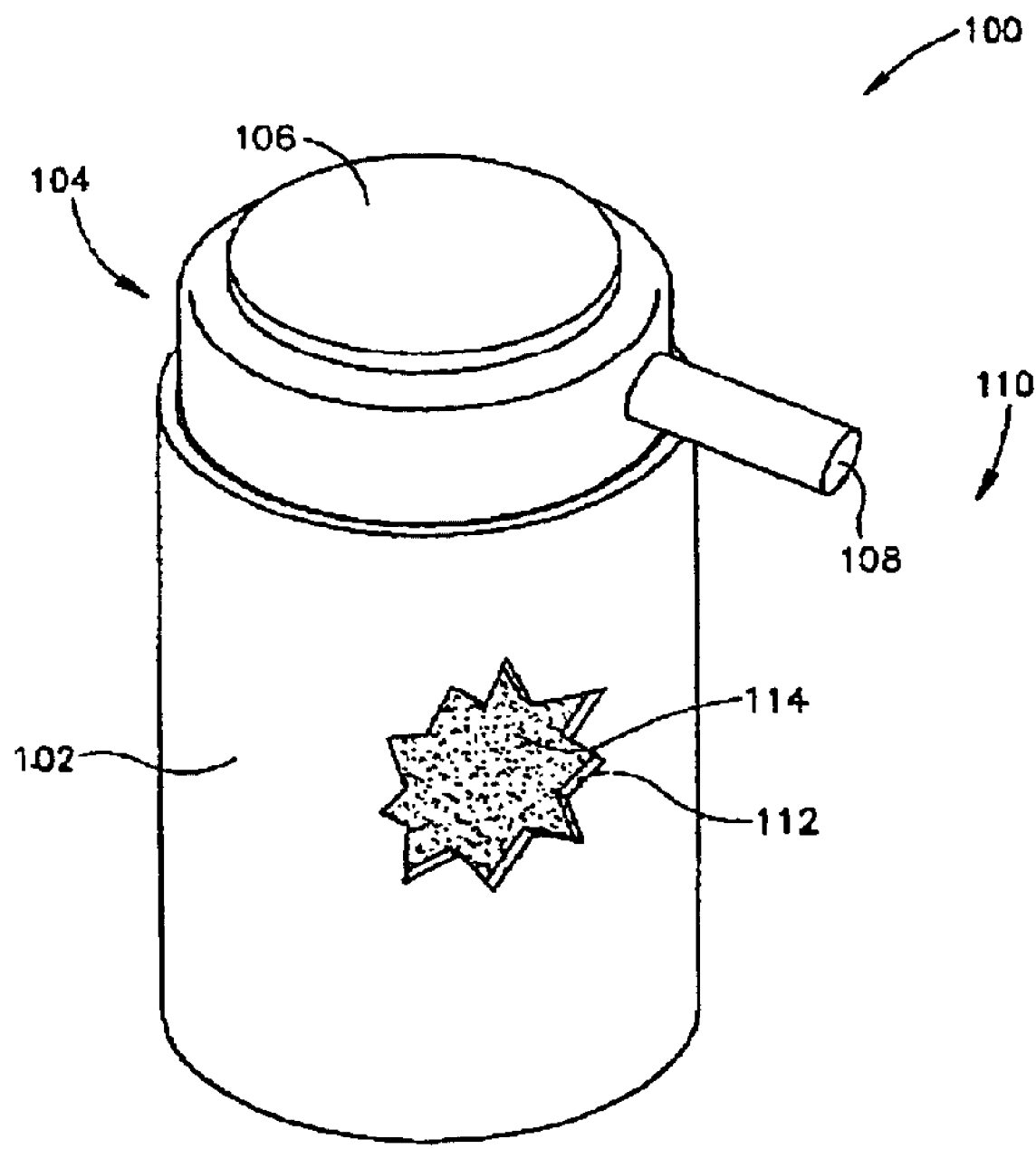
FIG. 1 is a schematic illustration of an inert gas spray canister used for animal behavior modification according to the preferred embodiment.

Reference is now made to FIG. 1, which is a schematic illustration of an inert gas spray canister used for animal behavior modification according to the preferred embodiment. Spray canister 100 is a typical inert gas spray canister having a body 102 and a cap 104. Cap 104 comprises trigger 106 and aperture 108. Spray canister 100 capacity differs according to canister size. Canister size may vary such as 100 grams, 300 grams or the like. Body 102 is a cylindrical container suitable for holding inert gas 112 at high pressure there within. A body 102 enclosure is made of metal alloy such as Aluminum alloy etc. Other materials suitable for body material can also be realized. Body 102 enclosure creates an inner space 112 there within. Body 102 is a closed container except for a relatively small opening (not shown) at one side where cap 104 joins body 102 in such a manner as to prevent gas from escaping body 102 unless trigger 106 is pressed. Cap 104 is fitted to body 102 by fastening means known in the art such as by plastic teeth attachments, metal band fastener etc. Cap 104 has a tube like space (not shown) connecting inner space 112, having high pressure condensed inert gas 114, and ambient air 110 just outside aperture 108 having normal atmospheric pressure. This connection is severed or blocked while trigger 106 is not pressed. Trigger 106 mechanism obstructing cap 104 tube like space connecting inner space 112 and ambient air 110 just outside aperture 108 involve a spring and latch mechanism known in the art (not illustrated). In a factory setting (not illustrated) spray canister 100 is filled with an inert gas at high pressure and sealed by cap 104. Inert gas can be Ethane, 1,1,1,2-tetrafloro also known as Arcton 134a as well as other gases of the Tumorigen compound class as well as other inert gases suitable for process described here and below. In operation spray 100 is typically hand held by user (not shown) and is aimed at a target such as an animal head. When user presses trigger 106 the tube like space within cap 104 becomes patent and high-pressure inert gas 114 within inner space 112 come in contact with ambient air 110. Due to pressure differences and according to physical gas laws, gas 114 flows from space 112 to ambient air 110.

This flow velocity depends on the pressure gradient between space 112 and ambient air 110. Gas 114 temperature is typically below ambient air temperature due to the fast expansion of gas 114 as it reaches ambient air 110. As a result of previous mentioned process sound is produced at the same time. This sound is irritating to animals with high auditory acuity. Inert gas spray canister 100 is typically used when hand held. Alternatively spray 100 can be attached to collar of animal or to leash as well as to a garment worn by the animal and used thereof.

Gas 114 flow, temperature and accompanying sound when applied to an animal is an unpleasant stimulus therefore is used to modify animal behavior using negative feedback mechanism.

Figure 2:
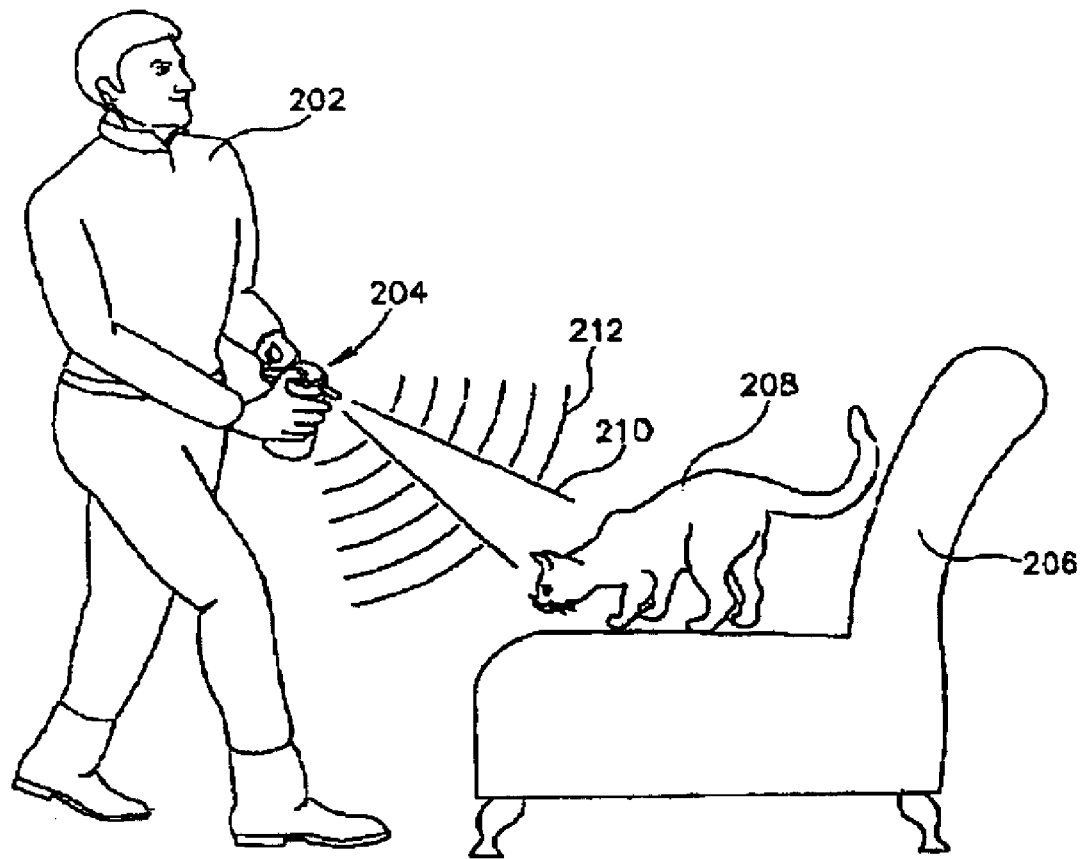
FIG. 2 is a schematic illustration of a person using the spray of the present invention for the purpose of animal behavior modification in accordance with the preferred embodiment.

Reference is now made to FIG. 2, which is a schematic illustration of a person using the inert gas spray canister of the present invention for the purpose of animal behavior modification in accordance with the preferred embodiment, and where user is referenced 202. User 202 is illustrated standing at a short distance; say one meter, from animal 208 seen lying on couch 206. User 202 holding spray 204 can be a pet owner, an animal trainer, a family member of pet owner, a bystander etc. Animal 208 can be a pet such as a dog, a cat, a hamster, a lizard, a bird and the like as well as wild animals such as a snake, scorpion etc.

Animal 208 can also be a domestic animal such as geese, a sheep, a horses etc.

Other animals having touch, temperature and hearing senses are also suitable for behavior modification by spray 204. User 202 uses spray 204 in order to modify animal 208 behaviors but can also be used for protection such that animal 208 can be deterred by spray 204 in case of attack. The behavior patterns that can be altered can include loitering in forbidden locations, biting owners, jumping on people, fighting between animals, jumping on sofas, making undesirable sounds such as barking and hissing, destroying property, attacking humans as well as other animals and the like. The process of behavior modification involves the use of spray 204 on animal 208 in the following manner. User 202 observes that animal 208 is performing an undesirable behavior such as lying on couch 206.

User 202 approaches animal 208 holding spray 204 in hand. When spray aperture 108 of FIG. 1 is within acceptable range preferably 30–50 centimeter from animal 208, user 202 aims aperture 108 of FIG. 1 towards head of animal 208 and presses trigger 106 of FIG. 1. Pressing trigger 106 of FIG. 1 releases a short, fast stream of inert gas 210 from aperture 108 of FIG. 1 accompanied by a loud noise 212. The sudden burst of fast gas stream 210 strikes the animal body such as the face and together with accompanying noise 212 provides for a non-pleasant negative feedback for animal behavior. This stimulus is so strong that present animal behavior is stopped immediately. For example, after applying spray 204 onto head of animal 208, animal 208 would immediately leave sitting site on couch 206. Following a repeated use of spray 204, animal new behavior is fixated.

Although the animal 208 part at which the fast stream of inert gas 210 is aimed at illustrated in FIG. 2 is the head, any other part of the animal 208 can be used such as the back, limbs and the like. The use of spray 204 can also be combined with oral instruction such as "go down", "away", "back" and the like. The use of vocalization may enhance behavior modification of spray 204. The use of spray 204 is completely harmless to the animal. Inert gas 114 of FIG. 1 has no toxic effect on the animal like other animal behavior modification devices and methods such as electric shock, usage of high concentration scents etc. Inert gas stream 210 temperature is such that no cold sores or burns are produces while in the gas form. The gas stream is harmless and the noise 212 audio intensity is low thus preventing irritation to human bystanders and precludes audio damage to the animal. Using spray 204 at a distance from the animal prevents the association of the user hand with harmful situation to the animal. This distance is close enough to associate user preference with a specified animal behavior or lack of thereof. In addition inert gas 114 of FIG. 1 is environmentally friendly. Spray 204 can be used for substantially more then one animal. Spray 204 can be used for a multitude of unwanted animal behavior patterns. Spray 204 being a pressurized inert gas canister must be handled with appropriate care as is known in the art.

Figure 3:
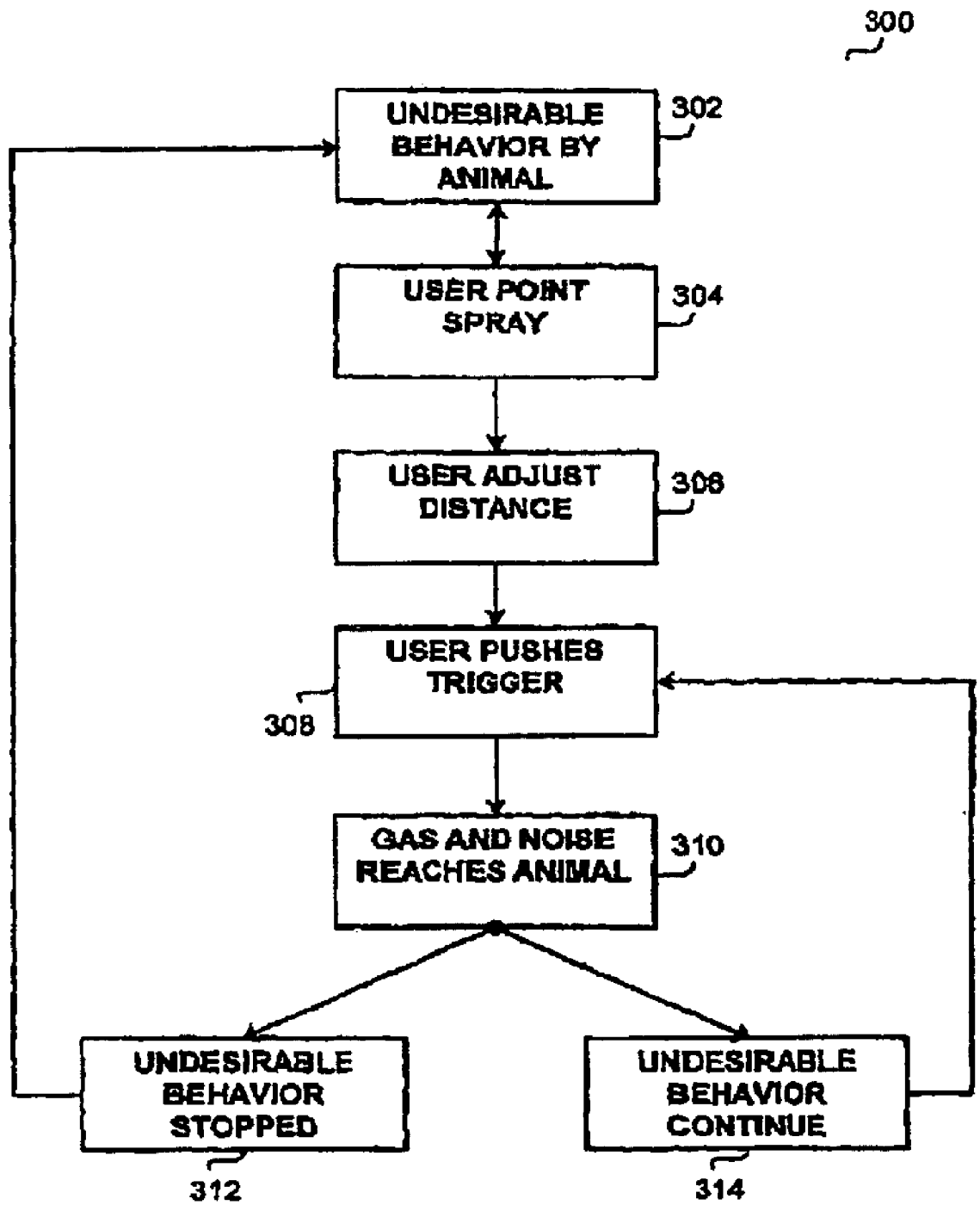
FIG. 3 is a flow chart diagram illustrating the process of using inert gas spray for animal behavior modification according to the preferred embodiment.

Turning how to FIG. 3, which is a flow chart diagram illustrating the process of using inert gas spray for animal behavior modification according to the preferred embodiment and where the process is generally referenced 300. In the process of using an inert gas spray for the animal behavior modification user 202 of FIG. 2 observe animal 208 of FIG. 2 performing an undesirable behavior or act as illustrated in step 302. In step 304, the user holding inert gas spray canister 204 of FIG. 2 points the spray canister aperture 108 of FIG. 1 to the animal body preferably the head. Inert gas of spray 204 of FIG. 2 is typically but not exclusively an inert gas of Tumorigen compound class. In step 306 user 202 adjust the distance of inert gas spray aperture or opening 108 of FIG. 1 to the animal body. For best results this distance is estimated at 30 centimeters to 50 centimeters. In step 308, user 202 pushes trigger 106 of FIG. 1 of inert gas spray canister 204 of FIG. 2 consequently discharging a short, fast, burst of inert gas stream from inert gas spray accompanied by a loud hissing noise. In step 310, gas stream 210 of FIG. 2 strike the animal body and noise 212 of FIG. 1 reaches animal auditory and sensory senses. Inert gas stream release temperature and noise are unpleasant for the animal thus act as an extinguishing or negative feedback stimuli. In step 312, following the application of negative feedback stimuli to the animal undesirable behavior stops. Providing that following negative feedback application by inert gas spray seen in step 308 through 310, animal undesirable behavior continues, as seen in step 314, user 202 can push trigger again as in step 308 until unwanted behavior stops. When the unwanted behavior has stopped as in step 312, user 202 can wait and observe the animal.

When an undesirable behavior arises again as in step 302, user 202 can repeat process 300.

It will be appreciated by persons skilled in the art that the present invention is not limited to what has been particularly shown and described hereinabove. Rather the scope of the present invention is defined only by the claims which follow.

What is claimed is:

1. A method for modifying animal behavior when animal performs an undesirable behavior, comprising discharging an inert gas stream at an animal body from an inert gas spray canister wherein the gas is inert gas of Tumorigen compound class.

2. The method of claim 1 wherein the inert gas stream is a short, fast inert gas stream striking the animal body.

3. The method of claim 1 wherein a sound created by the use of the gas spray canister is a loud hissing noise.

4. The method of claim 1 wherein the animal is any one or more of the following: a pet, a domestic animal, a wild animal.

5. The method of claim 1 wherein the insert gas stream is directed at the a head of the animal.

6. The method of claim 1 wherein the inert gas stream is discharged at a distance of about 30–50 centimeters from the animal.

7. The method of claim 1 wherein the behavior is any one or more of the following: vocalization, loitering in undesirable location, destroying property, engaging in fight with other animals, attacking humans.

8. An apparatus for modifying animal behavior, the apparatus comprising: a spray canister containing pressurized inert condensed gas wherein the inert condensed gas is 1,1,1,2- tetrafluoroethane, Chlorodifluoromethane.

9. An apparatus for modifying animal behavior, the apparatus comprising: a spray canister containing pressurized inert condensed gas wherein the inert condensed gas is 1,1,1,2- tetrafluoroethane, dichlorodifluoromethane.

10. An apparatus for modifying animal behavior, the apparatus comprising: a spray canister containing pressurized inert condensed gas wherein the inert condensed gas is dichlorodifluoromethane or chlorodifluoromethane.

11. An apparatus for modifying animal behavior, the apparatus comprising: a spray canister containing pressurized inert condensed gas wherein the inert condensed gas is 1,1,1,2- tetrafluoroethane.

* * * * *